US012442360B2

(12) United States Patent
Pedersen

(10) Patent No.: US 12,442,360 B2
(45) Date of Patent: Oct. 14, 2025

(54) METHOD FOR COMPUTER-IMPLEMENTED MONITORING OF A COMPONENT OF A WIND TURBINE

(71) Applicant: Siemens Gamesa Renewable Energy A/S, Brande (DK)

(72) Inventor: Niels Lovmand Pedersen, Gedved (DK)

(73) Assignee: SIEMENS GAMESA RENEWABLE ENERGY A/S, Brande (DK)

(*) Notice: Subject to any disclaimer, the term of this patent is extended or adjusted under 35 U.S.C. 154(b) by 977 days.

(21) Appl. No.: 17/612,005

(22) PCT Filed: Jun. 2, 2020

(86) PCT No.: PCT/EP2020/065196
§ 371 (c)(1),
(2) Date: Nov. 17, 2021

(87) PCT Pub. No.: WO2020/245108
PCT Pub. Date: Dec. 10, 2020

(65) Prior Publication Data
US 2022/0228569 A1 Jul. 21, 2022

(30) Foreign Application Priority Data
Jun. 6, 2019 (EP) .................... 19178834

(51) Int. Cl.
F03D 17/00 (2016.01)
F03D 15/00 (2016.01)
(Continued)

(52) U.S. Cl.
CPC ............ F03D 17/00 (2016.05); F03D 15/00 (2016.05); G06N 3/045 (2023.01); G06N 3/08 (2013.01);
(Continued)

(58) Field of Classification Search
None
See application file for complete search history.

(56) References Cited

U.S. PATENT DOCUMENTS

2013/0073223 A1  3/2013  Lapira et al.
2013/0261988 A1  10/2013 Chen
(Continued)

FOREIGN PATENT DOCUMENTS

CN    105604807 A    5/2016
CN    108291527 A    7/2018
CN    109477464 A    3/2019

OTHER PUBLICATIONS

Hasegawa Takanori et al: "Tandem Connectionist Anomaly Detection: Use of Faulty Vibration Signals in Feature Representation Learning", 2018 IEEE International Conference On Prognostics and Health Management (ICPHM), IEEE, Jun. 11, 2018 (Jun. 11, 2018), pp. 1-7.
(Continued)

Primary Examiner — Courtney D Heinle
Assistant Examiner — John S Hunter, Jr.
(74) Attorney, Agent, or Firm — Schmeiser, Olsen & Watts LLP

(57) ABSTRACT

Provided is a method for computer-implemented monitoring of a component of a wind turbine, having access to a trained machine learning model which has been trained for one or more components of the same type of wind turbines. The trained machine learning model is configured to provide an output referring to a predetermined fault occurring at a component of a wind turbine by processing vibration signals in a predetermined domain which are measured in the vicinity of the component during the operation of the wind turbine. Vibration signals are mapped to corresponding vibration signals valid for the component based on one or more given kinematic parameters of the component and one
(Continued)

or more given kinematic parameters of another component. The machine learning model is applied to the vibration signals valid for the component, resulting in an output referring to the predetermined fault occurring at the another component.

12 Claims, 2 Drawing Sheets

(51) Int. Cl.
   *G06N 3/045* (2023.01)
   *G06N 3/08* (2023.01)

(52) U.S. Cl.
   CPC ....... *F05B 2240/50* (2013.01); *F05B 2260/84* (2013.01); *F05B 2270/334* (2013.01); *F05B 2270/709* (2013.01)

(56) References Cited

U.S. PATENT DOCUMENTS

| 2017/0074250 A1 | 3/2017 | Yu et al. |
| 2018/0119677 A1 | 5/2018 | Qiao et al. |
| 2019/0063406 A1 | 2/2019 | Nielsen et al. |
| 2019/0145382 A1 | 5/2019 | Kreutzfeldt et al. |

OTHER PUBLICATIONS

Zheng Huailiang et al: "Cross-Domain Fault Diagnosis Using Knowledge Transfer Strategy: A Review", IEEE Access, vol. 7, Sep. 23, 2019 (Sep. 23, 2019), pp. 129260-129290.

Zhang et al: "An Overview of Deep Learning in Prognostics and Health ManagementLiangwei", 2019 Annual Reliability and Maintainability Symposium (RAMS), IEEE, Jan. 28, 2019 (Jan. 28, 2019), pp. 1-7.

Ei Jinhao et al: "Fault diagnosis of wind turbine based on Long Short-term memory networks", Renewable Energy, Pergamon Press, Oxford, GB, vol. 133, Oct. 9, 2018 (Oct. 9, 2018), pp. 422-432.

European Search Report for Application No. 19178834.8, dated Dec. 5, 2019.

PCT International Search Report & Written Opinion mailed Aug. 13, 2020 corresponding to PCT International Application No. PCT/EP2020/065196.

Meng Xiangping; Tian Kaiqiao; Wang Lei: Online diagnosis of gearbox faults in wind turbines based on fuzzy neural algorithm; 2017.

METHOD FOR COMPUTER-IMPLEMENTED MONITORING OF A COMPONENT OF A WIND TURBINE

CROSS-REFERENCE TO RELATED APPLICATIONS

This application claims priority to PCT Application No. PCT/EP2020/065196, having a filing date of Jun. 2, 2020, which is based off of EP Application No. 19178834.8, having a filing date of Jun. 6, 2019, the entire contents both of which are hereby incorporated by reference.

FIELD OF TECHNOLOGY

The following refers to a method and an apparatus for computer-implemented monitoring of a component of a wind turbine. Furthermore, the following refers to a corresponding computer program product and a corresponding computer program.

BACKGROUND

Embodiments of the invention refer to the field of fault detection with respect to components within a wind turbine based on vibration analysis. It known from the prior art to use machine learning models, like neural networks, in order to detect faults in wind turbines. Such machine learning models receive vibration signals of a monitored component in the wind turbine as an input and provide an output indicating the presence or absence of a specific fault occurring in the component.

Machine learning models for detecting a specific fault need to be trained by appropriate training data including fault data, i.e. vibration signals present at the occurrence of the specific fault within the wind turbine. However, such fault data are rare or need to be generated based on expensive test stands where faults (e.g. damages) are introduced to the components to be monitored. Moreover, machine learning models trained for one turbine type only have a good performance when used for monitoring this turbine type and not other turbine types.

SUMMARY

An aspect relates to enable a monitoring of a component of a wind turbine by using a machine learning model having been trained for one or more wind turbines of another type than the monitored wind turbine.

The method of embodiments of the invention enables a computer-implemented monitoring of a component of a wind turbine. The wind turbine having the monitored component is designated as the first wind turbine and the monitored component is designated as the first component. The method has access to an already trained machine learning model which has been trained for one or more second components of the same type of one or more second wind turbines, the one or more second wind turbines being wind turbines of another type than the first wind turbine. I.e., the training data are operation data from the one or more second components. In a preferred embodiment, the one or more second components of the one or more second wind turbines each have a function equivalent to the function of the first component of the first wind turbine. However, the function of the second components and the function of the first component may also be different. This difference is reflected by the mapping of step ii) described below. E.g., the first component may refer to a planet wheel whereas the type of the second components is a high speed pinion.

The trained machine learning model is configured to provide an output referring to a predetermined fault occurring at a second component of a second wind turbine by processing vibration signals in a predetermined domain which are measured in the vicinity of the second component during the operation of the second wind turbine. This second component can be any second component out of the one or more second components. In step ii) described below, reference is made to this second component. The trained machine learning model may be any known data driven model having been trained by machine learning using training data comprising vibration signals. Depending on the circumstances, the machine learning may be a supervised learning or unsupervised learning. In supervised learning, it is known for the vibration signals of a training data set whether the predetermined fault is present. This is not the case for unsupervised learning.

In a step i) of the method according to embodiments of the invention, vibration signals in the predetermined domain (being or having been) measured in the vicinity of the first component during the operation of the first wind turbine are provided. The process of measuring those vibration signals may be part of step i). Nevertheless, it is also possible that the vibration signals have been measured and stored beforehand so that step i) merely comprises the step of reading the vibration signals having been previously measured and stored. The vibration signals provided in step i) are based on outputs of one or more vibration sensors. However, the vibration signals need not refer directly to the sensor outputs but to signals derived from these outputs. Particularly, the vibration signals may be derived from the sensor outputs by a transformation, e.g. a Fourier transformation.

In a step ii) of the method according to embodiments of the invention, the vibration signals are mapped to corresponding vibration signals valid for the second component based on one or more given kinematic parameters of the first component and one or more given kinematic parameters of the second component.

In a step iii) of the method according to embodiments of the invention, the machine learning model is applied to the vibration signals valid for the second component which are determined in step ii). Due to the mapping in step ii), this will lead to an output referring to the predetermined fault occurring at the first component. This output may be stored in a storage and/or may be provided on a user interface, e.g. a display, in order to inform the user about the occurrence of a fault.

Embodiments of the invention are based on the finding that vibration signals of different components can be mapped to each other by considering the kinematics of both components. Hence, the machine learning model applied to the mapped vibration signals will provide the correct output with respect to the vibration signals of the monitored turbine. The inventors found out that good results can be achieved provided that a mapping of the vibration signals can be found, irrespective of the type of mapping. However, particularly good results can be achieved in case that a linear mapping is used between the vibration signals of the first component and the vibration signals of the second component.

In a particularly preferred embodiment, the vibration signals provided in step i) are determined in the frequency domain, i.e. the vibration signals include a frequency spectrum of the vibrations. Nevertheless, the vibration signals may also be provided in the well-known cepstrum-domain or any other domain.

In another preferred embodiment of the invention, the one or more given kinematic parameters of the first component are described by the same function type as the one or more given kinematic parameters of the second component but with different function parameters.

In another variant of embodiments of the invention, the one or more given kinematic parameters of the first component are one or more specific values within the predetermined domain contained within the vibration signals measured in the vicinity of the first component in case that the predetermined fault occurs. Analogously, the one or more given kinematic parameters of the second component are one or more specific values within the predetermined domain contained within the vibration signals measured in the vicinity of the second component in case that the predetermined fault occurs. E.g., the one or more specific values may refer to specific frequencies in the frequency domain or to corresponding values in the cepstrum-domain. It is known beforehand that a particular fault is associated with such specific values.

In another preferred embodiment, the component being monitored is a part of the drivetrain of the monitored wind turbine. E.g., the component may refer to a bearing supporting the rotor or to a gearbox or to a generator providing the electric power produced by the wind turbine.

In another preferred embodiment, the predetermined fault refers to a damage of a gearwheel or a damage of a bearing race or a damage of balls or rollers in a ball or roller bearing. These elements may e.g. be included in one of the above components of a drivetrain in a wind turbine.

In another preferred variant of embodiments of the invention, the machine learning model is based on one or more neural networks or on Principal Component Analysis. However, any other machine learning model may be used as well.

Besides the above method, embodiments of the invention refer to an apparatus for monitoring of a component of a wind turbine, where the apparatus comprises a means for performing the above described step i), a means for performing the above described step ii) and a means for performing the above described step iii). The means for performing step i) may comprise a measuring means for acquiring the vibration signals. I.e., the means may comprise one or more vibration sensors. Nevertheless, the means may only be implemented as a means for reading the vibration signals from a storage in case that the vibration signals have been stored beforehand. This type of means is used within the computer program product (non-transitory computer readable storage medium having instructions, which when executed by a processor, perform actions) and the computer program as defined below.

The apparatus of embodiments of the invention is configured to perform one or more preferred embodiments of the method according to embodiments of the invention.

Embodiments of the invention also refer to a computer program product with program code which is stored on a non-transitory machine-readable carrier, for carrying out the method of embodiments of the invention or one or more preferred embodiments of this method when the program code is executed on a computer.

Furthermore, embodiments of the invention refer to a computer program with program code for carrying out the method according to embodiments of the invention or one or more preferred embodiments of this method when the program code is executed on a computer.

BRIEF DESCRIPTION

Some of the embodiments will be described in detail, with reference to the following figures, wherein like designations denote like members, wherein.

DETAILED DESCRIPTION

Figure 1:
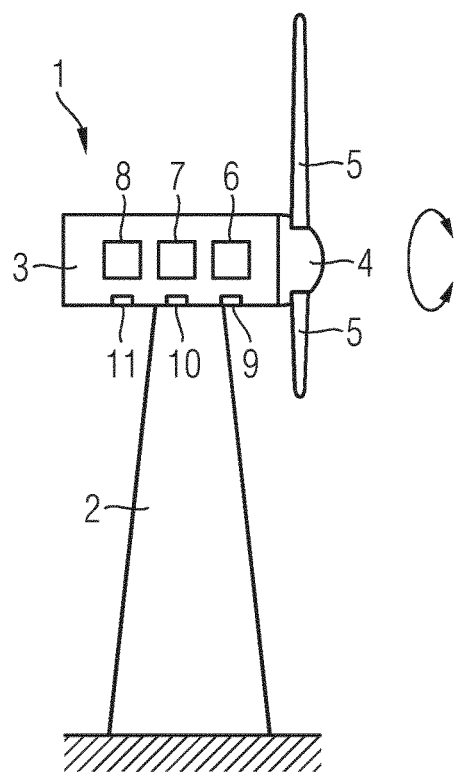
FIG. 1 shows an example of a wind turbine being monitored by an embodiment of the invention.

The method as described in the following is used for monitoring a component in a wind turbine. An example of such a wind turbine is shown in FIG. 1. The wind turbine is designated with reference numeral 1 and comprises a tower 2 on top of which a nacelle 3 is arranged. The nacelle is connected to a rotor having a hub 4 at which three rotating blades 5 are attached. A drivetrain for the wind turbine is accommodated within the nacelle 3. In the embodiment of FIG. 1, this drivetrain comprises a main bearing 6 for supporting the hub of the rotor as well as a gearbox 7 and a generator 8 for converting the mechanical power generated by the rotation of the rotor into electric power. Within the nacelle 3, there are provided three vibration sensors 9, 10 and 11. The vibration sensor 9 is located adjacent to the bearing 6, the vibration sensor 10 is located adjacent to the gearbox 7 and the vibration sensor 11 is located adjacent to the generator 8. Embodiments of the invention are not restricted to the use of just three vibration sensors. I.e., in other embodiments, a higher or lower number of vibration sensors may be used.

In the embodiment described herein, one of the components 6 to 8 of the drivetrain is monitored by processing the vibration signals detected by the sensor adjacent to the component. However, the method described in the following may be used for each of the components 6 to 8 so that all components within the nacelle are monitored. In another embodiment, the signals of several vibration sensors detecting vibrations of a respective components may be used for monitoring the respective component. Without loss of generality, embodiments of the invention are described in the following for monitoring the gearbox 7 based on the vibration signals of sensor 10.

Figure 2:
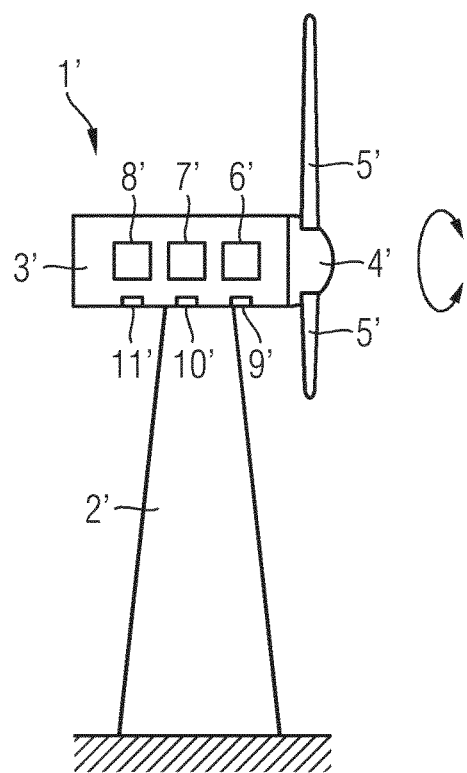
FIG. 2 shows a wind turbine based on which the machine learning model used for monitoring the turbine of FIG. 1 has been trained.

As a prerequisite of the method described herein, there already exists a pre-trained machine learning model. This machine learning model has been trained by training data from another turbine than the turbine 1. This turbine is shown in FIG. 2 and designated with reference numeral 1'. The turbine has the same components as the turbine in FIG. 1. Nevertheless, the turbine 1' is a turbine of another type than turbine 1 which is indicated by using apostrophes for the elements of the turbine in FIG. 2. The turbine 1' may be a turbine having the same construction as the turbine 1 but being from another manufacturer. In a modified embodiment, the machine learning model has been trained based on training data from several turbines 1' of the same type.

For the turbine 1', the above-mentioned machine learning model has been trained based on vibration signals of the sensor 10' where it was known whether the vibration signals refer to an operation of the wind turbine 1' where a specific fault and particularly a specific damage was present within the gearbox 7'. The training was based on a high number of training data sets including a considerable amount of vibrations signals referring to an operation accompanied by the specific fault within the gearbox 7'. Depending on the circumstances, the machine learning model can be trained for different fault types. E.g., a fault type may refer to a damage of a gearwheel or a damage of an inner race or outer race of a bearing or a damage of the balls or rollers of a bearing. The machine learning model was trained for one of such particular fault types.

In a preferred embodiment, the machine learning model refers to a neural network. However, other machine learning models, e.g. Principal Component Analysis, may be used. The machine learning model may be trained by any suitable learning method. In the embodiment described herein, the learning method is based on supervised learning where the training data include the information whether a fault is present in the gearbox for the respective training data sets. Nevertheless, the machine learning model may also be used in combination with a training based on unsupervised learning.

In order to use the trained machine learning method with respect to the turbine 1', vibration signals of the vibration sensor 10' are input into the model during the operation of the wind turbine 1' resulting in an output indicative of the specific fault. Depending on the circumstances, the output may be such that it indicates if the fault is present or not. However, the output may also be a probability with respect to the presence of the specific fault.

The idea of embodiments of the invention is to enable a monitoring of the turbine 1 based on the trained machine learning model although the training of the model was performed for another wind turbine 1'. This is achieved by an appropriate mapping taking into account kinematic parameters with respect to both turbines 1 and 1'. This will be described in the following with respect to FIG. 3 and FIG. 4.

Figure 3:
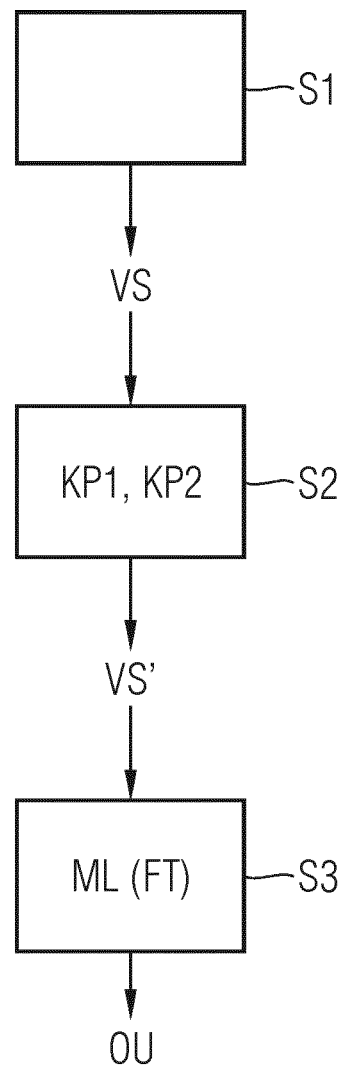
FIG. 3 is a flowchart showing the steps of a method according to an embodiment the invention.

FIG. 3 shows a flowchart illustrating an embodiment of the invention for monitoring the gearbox 7 of the turbine 1. In step S1, vibration signals VS originating from the sensor 10 are recorded. The vibration signals need not refer to the direct sensor outputs but may be pre-processed signals. In the embodiment described herein, the vibration signals are the sensor data after having applied a Fourier transform, i.e. the vibration signals are signals within the frequency domain.

In a step S2, the vibration signals VS valid for the sensor 10 of the turbine 1 are converted by a mapping into vibration signals VS' which are vibration signals which would have been occurred in the turbine 1' in case that the operation states of both gearboxes 7 and 7' were the same. I.e., in case that the vibration signals VS refer to a fault within the gearbox 7, this fault would also be present in the gearbox 7' if vibration signals VS' were detected. In order to perform the mapping, the knowledge of kinematic parameters KP1 with respect to wind turbine 1 and of kinematic parameters KP2 with respect to turbine 1' is used. The kinematic parameters KP1 refer to the component 7 and the specific fault being monitored. Analogously, the kinematic parameters KP2 refer to the component 7' and the specific fault being monitored.

In the following, an example for a mapping from VS to VS' is described. As the kinematic parameters for both turbines 1 and 1', so-called damage frequencies occurring at the specific fault are used. Those damage frequencies are known beforehand and can be expressed by the following formula:

$$f = n \cdot f_c + z \cdot f_m \quad (1)$$

The frequencies $f_c$ and $f_m$ are completely described by the kinematics of the respective components 7 and 7' and the rotation speed of the shaft. In the above formula, $f_c$ represents the gearmesh frequency in case that a damage of a gearwheel is the specific fault. Analogously, $f_c$ may refer to the frequency of an inner race or an outer race in case of a specific fault referring to cracks in these races or it may refer to a ball or roller spin frequency in case of a specific fault referring to the balls or rollers within a ball/roller bearing. The frequency $f_c$ is known but is different for the components 7 and 7'. Furthermore, $f_m$ in the above formula represents a known sideband frequency present when the specific fault occurs. Analogously to the frequency $f_c$, the frequency $f_m$ is known but is different for the components 7 and 7'. Moreover, n, z are integers.

In the following, the frequencies occurring in the gearbox 7 of wind turbine 1 are designated by the index A, whereas the frequencies occurring in the gearbox 7' of wind turbine 1' are designated as B. In other words, index A refers to the component 7 and index B refers to the component 7'.

In the embodiment described herein, a linear mapping $T(\bullet)$ is used for converting the vibration signals VS into the vibrations signals VS'. I.e., the mapping is described by the function $T(x) = ax + b$. However, other mappings than linear mappings also provide good results in case that a corresponding mapping can be found.

Using the above formula (1), the kinematic parameters for the gearboxes 7 and 7' are as follows:

$$f^A = n \cdot f^A_c + z \cdot f^A_m$$

$$f^B = n \cdot f^B_c + z \cdot f^B_m$$

Based on the above equations, parameters a and b shall be determined such that $f^B = T(f^A)$. Thus, the following applies:

$$f^B = T(f^A) \Leftrightarrow n \cdot f^B_c + z \cdot f^B_m = a \cdot (n \cdot f^A_c + z \cdot f^A_m) + b \Leftrightarrow 0 = n \cdot (a \cdot f^A_c - f^B_c) + z \cdot (a \cdot f^A_m - f^B_m) + b$$

In order to determine a and b, the following two equations (i) and (ii) are solved:

$$0 = n \cdot (a \cdot f^A_c - f^B_c) + b \quad (i)$$

$$0 = z \cdot (a \cdot f^A_m - f^B_m) \quad (ii)$$

Solving equation (ii) will provide the parameter a as follows:

$$a = f^B_m / f^A_m \text{ for } z \neq 0 \quad (ii)$$

Solving equation (i) will provide the parameter b as follows:

$$b = n \cdot (f^B_c - a \cdot f^A_c) = n \cdot (f^B_c - f^A_c \cdot f^B_m / f^A_m) = n \cdot (f^B_c \cdot f^A_m - f^A_c \cdot f^B_m) / f^A_m \quad (i)$$

The above mapping is dependent on n. The mapping was derived within the frequency domain. Nevertheless, the mapping may also be derived in the same way for the well-known cepstrum-domain.

Based on the mapping T, the vibration signals VS are converted in step S2 into the vibration signals VS' as shown in FIG. 3. In a next step S3, the vibration signals VS' are fed as input data to the trained machine learning model which is designated as ML in FIG. 3. As mentioned above, the machine learning model provides an output indicative of the specific fault where this fault is designated as FT in FIG. 3. Hence, when applying the machine learning model ML to the vibration signals VS', the output OU referring to the fault FT is generated. Due to the mapping, this output will indicate whether there is a fault within the gearbox 7 of the wind turbine 1 although the machine learning model has been trained for a different gearbox 7' in another wind turbine 1'.

Embodiments of the invention as described in the foregoing are based on the knowledge that vibration signals of rotating machines are characterized by variations in amplitudes and frequencies that can be explained by the kinematics of the machine components. These characteristics change when anomalies occur. Thus, a fault or damage type has a vibrational pattern that can be described by the component kinematics. Therefore, for each fault type, the vibration signals from one component can be mapped to another component using the kinematics of both components.

Figure 4:
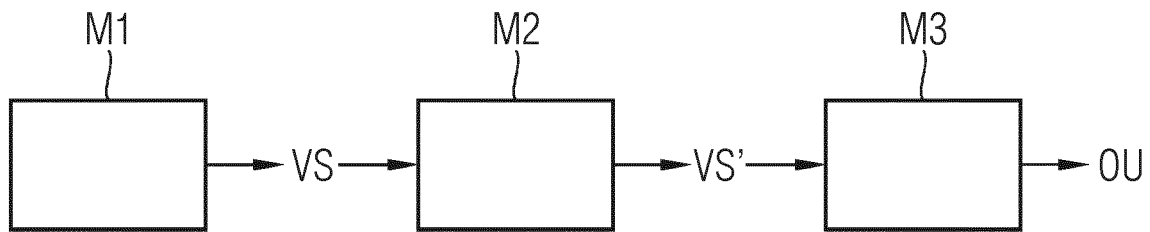
FIG. 4 is a diagram illustrating the components used for performing the method shown in FIG. 3.

FIG. 4 shows an apparatus for performing the method described with respect to FIG. 3. The apparatus comprises a means M1 providing the vibration signals VS. In the embodiment described herein, means M1 comprises the vibration sensor 10 detecting the vibrations. Nevertheless, in a modified embodiment, the vibration sensor is not part of the apparatus. In this case, the vibration signals have been acquired and stored beforehand and means M1 just accesses the storage for retrieving the vibration signals. To do so, means M1 is part of a computer program implemented on a computer. This computer program also comprises means M2 and M3 which are described in the following.

Means M2 performs the mapping as shown in step S2 of FIG. 3. The vibration signals VS' resulting from this mapping are processed by means M3 which performs step S3 of FIG. 3. I.e., the machine learning model ML is implemented in means M3 and, by applying this model to the vibration signals VS', the output OU indicative of the specific fault is generated. This output may be stored in a storage and/or may be provided on a user interface, e.g. a display, in order to inform the user about the occurrence of a fault.

The embodiment described above has several advantages. Particularly, a pre-trained machine learning model can be used for monitoring a wind turbine other than the wind turbine for which the machine learning model has been trained. This can be achieved by an appropriate mapping based on known kinematic parameters with respect to the monitored wind turbine and the wind turbine used for training the machine learning model. Due to the use of a pre-trained machine learning method, there is no need for developing fault detection algorithms for new wind turbines. Moreover, the method of embodiments of the invention artificially generates new training data and allows for further development and design of new machine learning algorithms.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for computer-implemented monitoring of a component of a wind turbine, where the wind turbine is a first wind turbine and the component is a first component, the method comprising:

i) operating the first wind turbine to produce vibration signals in a predetermined domain that are measured in a vicinity of the first component the operating of the first wind turbine;

ii) mapping the vibration signals to corresponding vibration signals valid for a second component of a second wind turbine based on one or more given kinematic parameters of the first component and one or more given kinematic parameters of the second component; and iii) feeding, as an input, the corresponding vibration signals valid for the second component into a trained machine learning model, the trained machine learning model being trained for the second component of the second wind turbine, which is a same type as the first component, the second wind turbine being of another type than the first wind turbine, wherein the trained machine learning model is configured to provide an output referring to a predetermined fault occurring at the second component of the second wind turbine by processing vibration signals in a predetermined domain which are measured in a vicinity of the second component during an operation of the second wind turbine; and iv) generating an output from the trained machine learning model indicative of a predetermined fault of the first component of the first component.

2. The method according to claim 1, wherein the predetermined domain is the frequency domain or the cepstrum domain.

3. The method according to claim 1, wherein the one or more given kinematic parameters of the first component are described by a same function type as the one or more given kinematic parameters of the second component but with different function parameters.

4. The method according to claim 1, wherein the one or more given kinematic parameters of the first component are one or more specific values within the predetermined domain contained within the vibration signals measured in the vicinity of the first component in case that the predetermined fault occurs, and wherein the one or more given kinematic parameters of the second component are one or more specific values within the predetermined domain contained within the vibration signals measured in the vicinity of the second component in case that the predetermined fault occurs.

5. The method according to claim 1, wherein the component being monitored is a part or the drivetrain of the wind turbine.

6. The method according to claim 1, wherein the predetermined fault refers to a damage of a gearwheel or a damage of a bearing race or a damage of balls or rollers in a ball or roller bearing.

7. The method according to claim 1, wherein the machine learning model is based on one or more neural networks or on Principal Component Analysis.

8. A computer program product, comprising a non-transitory computer readable hardware storage device having computer readable program code stored therein, said program code executable by a processor of a computer system to implement the method according to claim 1 when the program code is executed on a computer.

9. The method according to claim 1, further comprising: storing the output and/or displaying a notification on a user interface indicative of the output.

10. An apparatus for monitoring of a component of a wind turbine, where the wind turbine is a first wind turbine and the component is a first component, the apparatus comprising:
one or more processors configured to:
operate the first wind turbine to produce vibration signals in the predetermined domain that are measured in a vicinity of the first component during an operation of the first wind turbine;
map the vibration signals to corresponding vibration signals valid for a second component of a second wind turbine based on one or more given kinematic parameters of the first component and one or more given kinematic parameters of the second component; and
feed, as an input, the corresponding vibration signals valid for the second component into a trained machine learning model, the trained machine learning model being trained for the second component of the second wind turbine, which is a same type as the first component, the second wind turbine being of another type than the first wind turbine, wherein the trained machine learning model is configured to provide an output referring to a predetermined fault occurring at the second component of the second wind turbine by processing vibration signals in a predetermined domain which are measured in a vicinity of the second component during an operation of the second wind turbine; and
generate an output from the trained machine learning model indicative of a predetermined fault of the first component of the first component; and
store the output and/or display a notification on a user interface indicative of the output.

11. The apparatus according to claim 10, wherein the apparatus is configured to perform a method for monitoring a component of a wind turbine.

12. The apparatus according to claim 10, wherein the one or more processors are further configured to store the output and/or display a notification on a user interface indicative of the output.

\* \* \* \* \*